United States Patent
Everett

[11] Patent Number: 6,021,600
[45] Date of Patent: Feb. 8, 2000

[54] ARTICLE OF MANUFACTURE FOR SECURING LANDSCAPE TIMBER

[75] Inventor: Daniel G. Everett, Oley, Pa.

[73] Assignee: New Standard Corporation, Mount Joy, Pa.

[21] Appl. No.: 09/017,709

[22] Filed: Feb. 5, 1998

Related U.S. Application Data

[60] Provisional application No. 60/036,934, Feb. 7, 1997.

[51] Int. Cl.[7] ..................................................... A01G 1/08
[52] U.S. Cl. ................................................. 47/33; 52/102
[58] Field of Search ..................................... 405/284, 285, 405/258, 273; 52/102; 47/33

[56] References Cited

U.S. PATENT DOCUMENTS

| | | | |
|---|---|---|---|
| 992,529 | 5/1911 | Abraham | 47/33 |
| 1,945,784 | 2/1934 | Myer | 47/33 |
| 4,508,319 | 4/1985 | Tappan et al. | 47/33 |
| 4,967,522 | 11/1990 | Keen | 47/33 |

*Primary Examiner*—David Bagnell
*Assistant Examiner*—Frederick L. Lagman
*Attorney, Agent, or Firm*—Long, Aldridge & Norman, LLP; Steven B. Kelber

[57] ABSTRACT

A one piece steel device is provided to hold landscape lumber, such as railroad timbers and the like, in fixed proper relationship. The body is triangular in shape, to be driven into the ground by the point of the triangle. The opposite end extends in two flanges which are separated by a support shelf. The support shelf and the center line of the triangular body may be bent through any angle, the support shelf preferably comprising two pieces meeting at the center line extending outwardly from the base of the triangular portion. The triangular body is driven into earth, after bending the article along its center line to the angle two adjacent pieces are desired to be held at. Each timber piece is secured to one of the flanges by driving retaining members through holes provided in the flanges in or through the lumber.

4 Claims, 4 Drawing Sheets

ARTICLE OF MANUFACTURE FOR SECURING LANDSCAPE TIMBER

This application is a regular National application claiming priority from Provisional Application, U.S. application Ser. No. 60/036,934 filed Feb. 7, 1997.

BACKGROUND OF THE INVENTION

1. Field of the Invention

This invention pertains to a metal article useful for retaining landscaping timber, of the type typically used in the construction of gardens, retaining walls, and the like, in desired position. More specifically, a one piece structure of galvanized steel is provided which may retain two landscaping timbers in proper juxtaposition.

2. Background of the Prior Art

A wide variety of landscaping projects call for the use of landscape lumber, typically, lumber either originating as, or treating to reflect the appearance of, railroad ties. These landscaping materials are heavy, difficult to fit precisely, and will move over time with the natural expansion and contraction of the earth, shifts in the underlying surface, etc. Current techniques for anchoring landscape lumber include the insertion of "wedges" or "shims" along the length of the timber, driven at an angle into the earth underlying the timber, in an effort to hold the timber in place against some restraining force, typically an earth backing, or another piece of lumber. These approaches are unattractive, imprecise, and liable to slip over time. Even the preparation of a simple garden bed, in a rectangular shape, can be difficult to maintain over time.

Accordingly, it is an object in the industry to provide a simple, inexpensive and reliable article of manufacture to make possible the maintenance of landscape lumber, such as railroad timbers pressure treated timbers and the like, in a proper relationship both with adjacent timbers, and with respect to the ground on which they are located.

SUMMARY OF THE INVENTION

The above objects, and other objects are met by the invention described in detail below and illustrated in the figures attached hereto, which is commercially referred to under the name "Timber Tie". In a preferred embodiment, this device is a unitary piece of galvanized or similarly treated steel that anchors and supports landscape lumber. This retaining device is principally comprised of a triangular body, typically about one foot in length. The body is provided with slots, or similar perforations or weakening, along the longitudinal center line (height) of the triangular body, to simplify bending of the body to the proper angle. Extending above this triangular body are two flanges, separated by a support ledge. The flanges are preferably provided with means for securing the timbers. Between the flanges, at the top of the triangular body, is a support ledge.

Timber can be secured to one of the two flanges of the unitary piece, with the body having been bent to attach a second piece to the second flange in appropriate relationship. Thus, to prepare a ninety degree corner, the body is bent along the perforation or weakened center line at ninety degrees, each flange being secured to adjoining pieces of wood.

BRIEF DESCRIPTION OF THE FIGURES

This invention is more clearly understood by reference to the figures attached hereto, wherein like reference characters refer to like elements.

DETAILED DESCRIPTION OF THE INVENTION

This invention may be better understood by reference to the drawings set forth above, and the detailed discussion of the invention, and its use, as set forth below. The article of manufacture that constitutes this invention is referred to, herein below, as the "Timber Tie".

Figure 1:
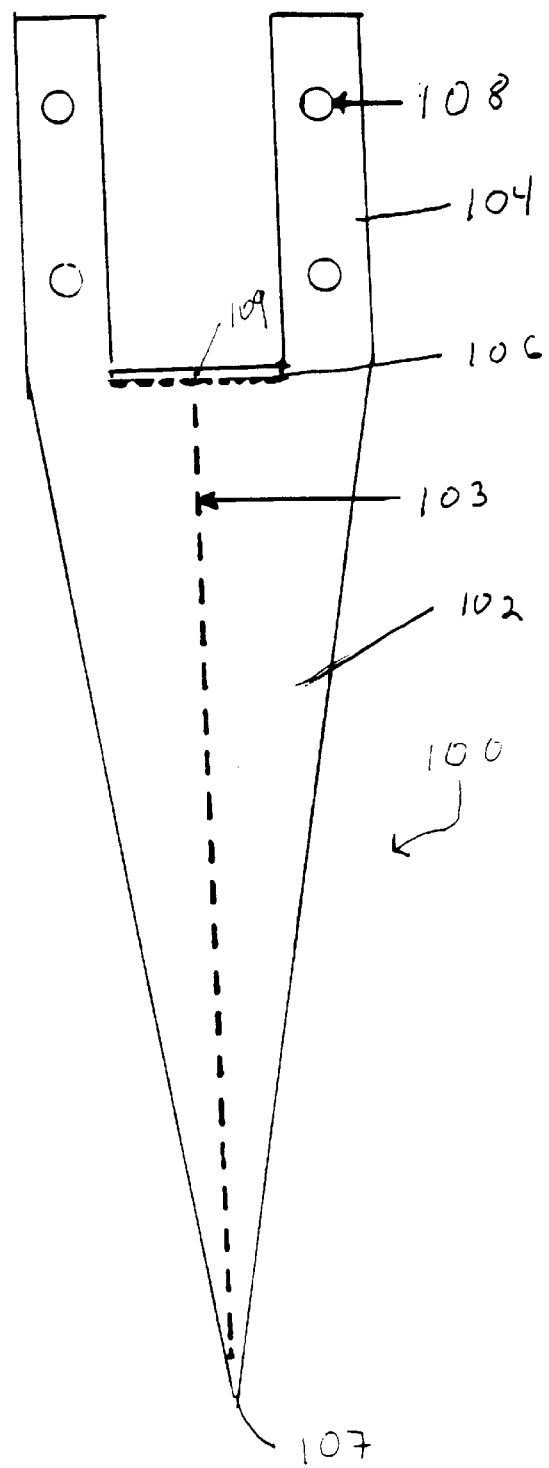
FIG. 1 is a front view of an unbent article of manufacture according to this invention.
Figure 2:
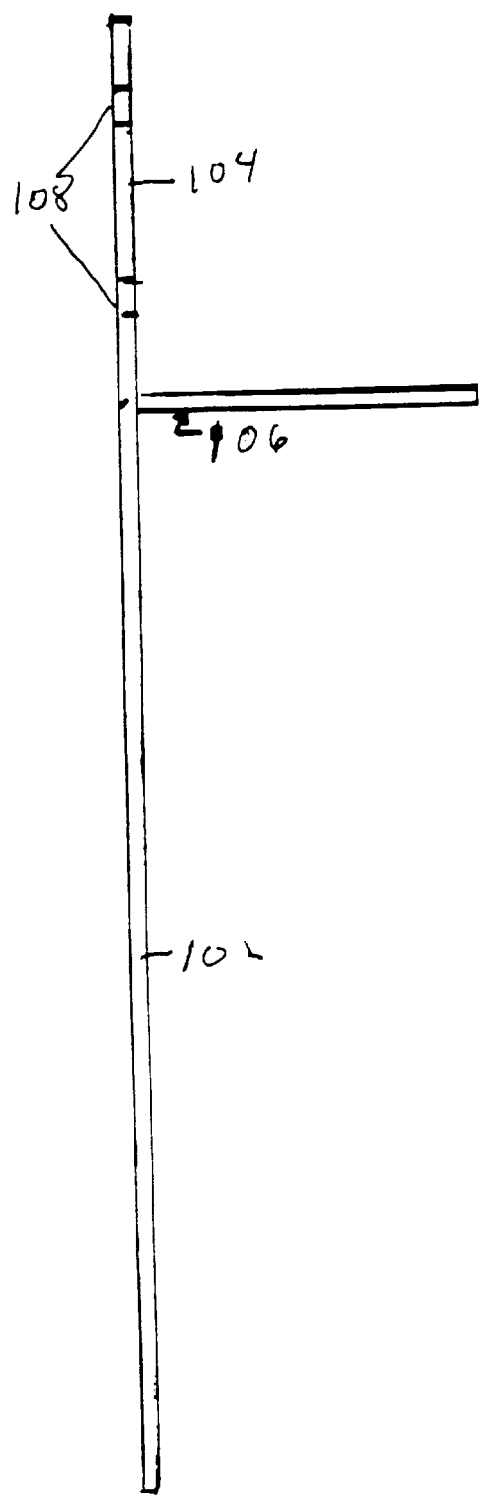
FIG. 2 is a side view of the inventive article.

FIG. 1 most clearly illustrates the Timber Tie. The body of the Timber Tie is generally indicated at 100. As shown, the main portion of the body 102 is triangular in shape, tapering to a point. Extending upwardly at either side of the base of the triangular body are flanges 104. These flanges may preferably be provided with holes, or "knock-out" scored areas, for receiving retaining means, such as bolts, screws and the like. The flanges 104 are separated by a support shelf 106, most clearly shown in FIG. 2. Support shelf 106 is broad enough to receive the landscape lumber to be retained by the Timber Tie. Importantly, the body 102 and shelf 106 is provided with perforations, slots, or weakened area extending along the center line of the body from support shelf 106 to point 107, to facilitate bending of the body.

In use, each flange of the Timber Tie is secured to an adjacent piece of landscape lumber. Because body 102 of the Timber Tie can be bent along center line 103, the timber can be received, and held, at any angle to an adjacent timber. Support shelf 106 is split in the middle, to permit bending.

Figure 3:
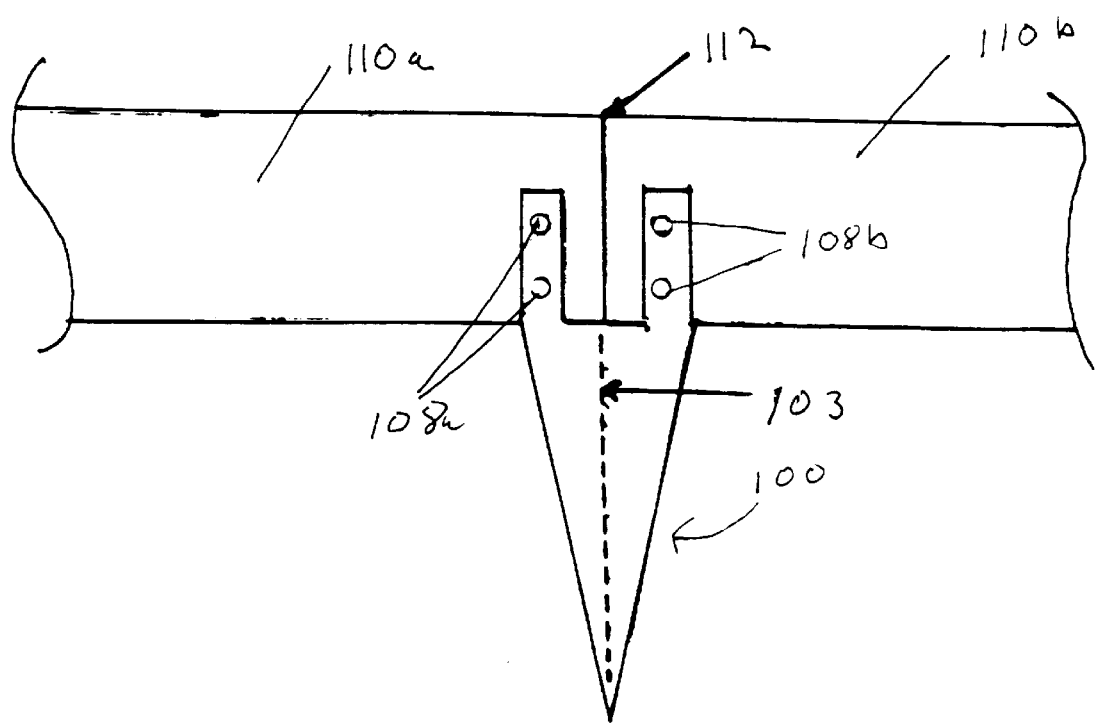
FIG. 3 illustrates the use of the inventive article to secure two pieces of landscape lumber abutted in a straight line.

The Timber Tie may be used to hold two pieces of landscape lumber in direct, linear abutment, where the project, such as garden wall, retaining wall, wall along a foundation, etc., requires a dimension longer than the available lumber. As shown in FIG. 3, two pieces of lumber 110a and 110b are held together in abutment at line 112. Lumber 110a is secured to Timber Tie 100 by screws or bolts 108a. Lumber 110b is secured to Timber Tie 100 by screws or bolts 108b. In this case, because the timber is held in linear relationship (an angle of 180°) no bending is required and the Timber Tie is not bent along line 103.

Figure 4:
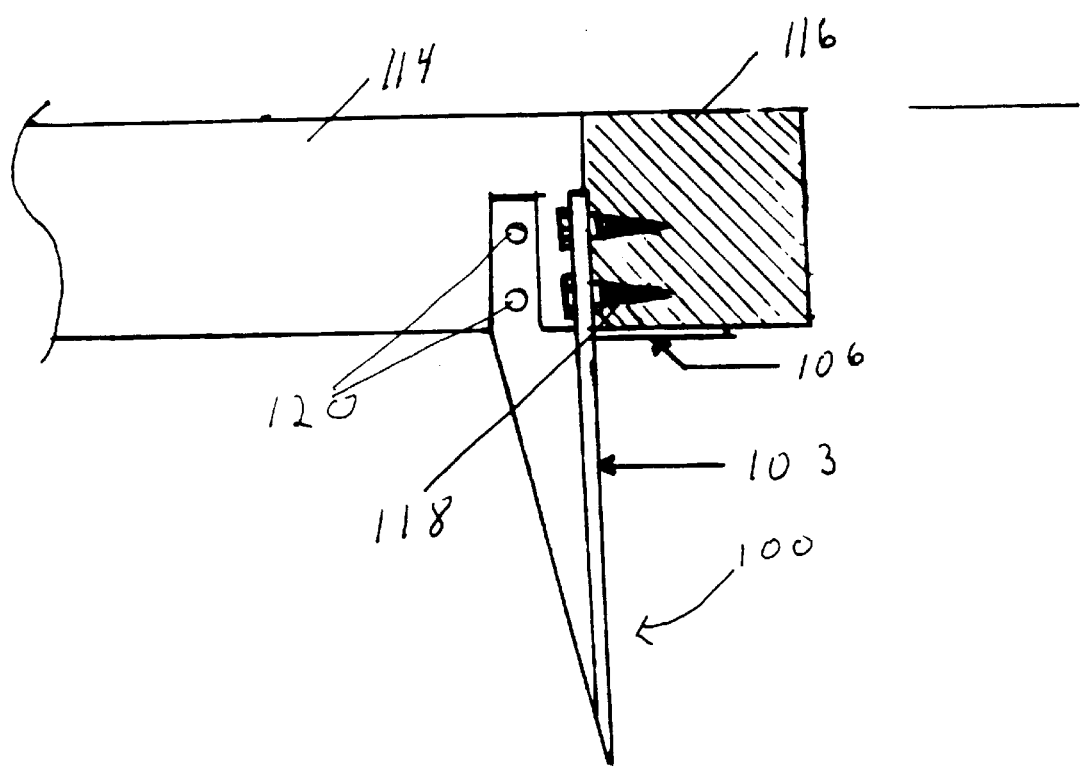
FIG. 4 illustrates the use of the inventive article to connect landscape timbers in a ninety degree angle.

FIG. 4 illustrates the use of the inventive article to hold two pieces of lumber at a ninety degree angle. First piece 114 is secured to the Timber Tie by screws or bolts 120. The relationship of the Timber Tie screws and lumber is shown in FIG. 4 with respect to timber 116, which is secured at an angle of ninety degrees with respect to timber 114 (i.e., it is directed out of the plane of the paper). With heads large enough to not pass through holes 108, screws 118 penetrate the lumber, which rests on shelf 106, holding the lumber in place. In this case, because it is desired to have a square corner, Timber Tie 100 is bent along line 103 at ninety degrees.

This invention may be used to hold timber in any relationship, allowing it to be bent through settings of 0–180° angle. To bend the inventive article to the desired angle, one side of body 102 is secured in a vice, close to center line 103. The other side of body 102 is held, preferably with a wrench or similar device, and bent through the desired angle. A simple cardboard template can be made of the first bent tie, to provide for easy precision bending on a repeat basis. It will be clear that the angle at and above the ledge 106 is critical to retain the lumber in proper orientation. Below the ledge, in the event the tapered body 102 falls out of alignment, since this becomes the anchor section, driven into the ground, no adverse affects will be observed.

The use of Timber Tie can be most easily demonstrated for a simple square or rectangular garden, although it will be recognized that this example can be expanded to any shape. For such a structure, four Timber Ties are bent to ninety degree angles to produce inside corner sections. As noted above, if sections longer than the available landscape lumber are desired, e.g., about eight feet, additional ties may be used to provide a rigid structure. For relatively flat surfaces, no ground preparation is required. The starting point is any one of the corners. The Timber Tie is driven into the ground to a firm depth, e.g., ten inches or so. A string line, tape measure, or other locating device is used to square and locate the remaining corners, and place the timbers to provide the basic square structure. When the corners are squared, the timber is pre-drilled and secured with hex head lag screws, bolts or other retaining device. The structure is completed by driving all four ties to their final depth. A depth of at least about twelve inches for body 103 is recommended.

If necessary, the Timber Tie may be anchored with expansion bolts directly to a foundation wall. If not anchored, because a rigid structure of this type "floats" with ground expansion and contraction, shifting of the timber due to seasonal change, and considerations of frost line, need not be taken into account.

This invention has been disclosed generically, and by reference to specific embodiments. Examples are not limiting, an alternatives will occur to those of ordinary skill in the art, particularly in terms of retaining means, materials, methods of bending and the like. These alternatives remain within the scope of the invention, unless excluded by the recitation of the claims set forth below.

What is claimed is:

1. An article of manufacture for retaining landscape lumber in proper relationship, comprising:

a unitary body of metal or metal alloy, wherein said body is comprised of a major triangular portion terminating in a point, said body further comprising two flanges extending from an end of said body opposite said point at either side of said end, said flanges being separated by a support ledge extending outwardly from said body, wherein said triangular portion and said support ledge may be bent at any angle of 0–180° along a center line there through, wherein said body is provided along said center line of said triangular portion with weakened material to facilitate bending along said center line, and said support ledge is comprised of two adjacent pieces meeting at said center line.

2. The article of claim 1, wherein said center line is weakened by providing perforations along said center line.

3. The article of claim 1, wherein said flanges are provided with holes to receive retaining members for retaining timber in fixed position against said flanges.

4. The article of claim 1, where said article has been treated to resist at least one of rust and corrosion.

* * * * *